(12) United States Patent
Ball et al.

(10) Patent No.: US 8,396,828 B2
(45) Date of Patent: Mar. 12, 2013

(54) PROVIDING LIGHTWEIGHT MULTIDIMENSIONAL ONLINE DATA STORAGE FOR WEB SERVICE USAGE REPORTING

(75) Inventors: Christopher Ball, Seattle, WA (US);
Chinna Polinati, Snoqualmie, WA (US);
Chenlei Guo, Redmond, WA (US);
Pravjit Tiwana, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 260 days.

(21) Appl. No.: 12/882,139

(22) Filed: Sep. 14, 2010

(65) Prior Publication Data
US 2012/0066204 A1     Mar. 15, 2012

(51) Int. Cl.
*G06F 7/00*     (2006.01)
*G06F 17/00*    (2006.01)

(52) U.S. Cl. ........ 707/602; 707/603; 707/607; 707/736; 707/802; 707/803

(58) Field of Classification Search .................. 707/600, 707/602, 603, 607, 736, 802, 803
See application file for complete search history.

(56) References Cited

U.S. PATENT DOCUMENTS

| | | | |
|---|---|---|---|
| 6,775,675 B1 | 8/2004 | Nwabueze et al. | |
| 7,293,083 B1 | 11/2007 | Ranous et al. | |
| 7,356,779 B2 | 4/2008 | Cras et al. | |
| 7,672,964 B1 * | 3/2010 | Yan et al. | 707/999.102 |
| 7,739,666 B2 | 6/2010 | Zhu et al. | |
| 8,185,619 B1 * | 5/2012 | Maiocco et al. | 709/224 |
| 8,208,893 B1 * | 6/2012 | Ryan | 455/405 |
| 2002/0069037 A1 * | 6/2002 | Hendrickson et al. | 702/186 |
| 2002/0091636 A1 * | 7/2002 | Carroll Bullard | 705/40 |
| 2003/0236874 A1 * | 12/2003 | Hotti | 709/224 |
| 2004/0252646 A1 * | 12/2004 | Adhikari et al. | 370/252 |
| 2005/0080810 A1 * | 4/2005 | Matsuura | 707/102 |
| 2006/0072583 A1 * | 4/2006 | Sanda et al. | 370/395.53 |
| 2006/0116981 A1 | 6/2006 | Krimmel et al. | |
| 2008/0310303 A1 * | 12/2008 | Wang et al. | 370/230.1 |
| 2009/0138427 A1 | 5/2009 | Kalavade | |
| 2009/0295992 A1 * | 12/2009 | Richardson et al. | 348/515 |
| 2011/0016469 A1 * | 1/2011 | Klein | 718/100 |

OTHER PUBLICATIONS

Tang, et al., "Multidimensional Traffic Data Analysis: A Congestion Cube Approach", Retrieved at << https://netfiles.uiuc.edu/tang18/shared/Congestion_Cube_Report.pdf >>, Mar. 18, 2010, pp. 1-26.
Lawton, George, "Distributed Data-Analysis Approach Gains Popularity", Retrieved at << http://www.computer.org/portal/web/computingnow/archive/news050 >>, Feb. 2010, pp. 4.
Shaikh, et al., "Multi-Dimensional Analysis of ISA Server Logs", Retrieved at << http://www.ijcte.org/papers/044.pdf >>, International Journal of Computer Theory and Engineering, vol. 1, No. 3, Aug. 2009, pp. 272-275.
Buchner, et al., "Discovering Internet Marketing Intelligence through Online Analytical Web Usage Mining", Retrieved at << http://citeseerx.ist.psu.edu/viewdoc/download?doi=10.1.1.128.4795&rep=rep1&type=pdf >>, vol. 27, Issue 4, Dec. 1998, pp. 8.

* cited by examiner

*Primary Examiner* — Hares Jami

(74) *Attorney, Agent, or Firm* — Turk IP Law, LLC

(57) ABSTRACT

Distributed and local processes analyze usage data and transform it into objects including timestamps and dimensions. Objects include a position vector to represent dimension analysis and additional attributes associated with measurements of different types. The objects are stored in a multidimensional database indexed on the vector and timestamp attributes.

17 Claims, 7 Drawing Sheets

PROVIDING LIGHTWEIGHT MULTIDIMENSIONAL ONLINE DATA STORAGE FOR WEB SERVICE USAGE REPORTING

BACKGROUND

Explosive expansion of data consumption has led to expanded demand to process and analyze data utilization. Market and business requirements such as service improvements, capacity assessments, and customer demand continually raise data consumption metrics gathering and analysis demands. Online services provide a unique opportunity in allowing direct access to utilization metrics. Gathered metrics are available to multitude of analysis schemes for system study and evaluation. In return, analysis schemes impact various business needs such as targeted improvements, return on investments, and demand predictions.

In modern systems, quality of service (QoS) and usage reporting are two service areas, where online services excel at analyzing and providing consumption metrics. Components of online services have different demands for quality of service and usage reporting. System architectures (e.g. message based, session based, request based, etc.), usage patterns (user-initiated, scheduled processes, asynchronous processes), and application layers (externally visible, internal service) may set difficult demands on QoS and usage reporting systems.

Conventional distributed data processing systems provide different approaches to performing analysis and aggregation of large quantities of usage data. However, such systems are distributed batch processing systems and are typically not online systems suitable for reporting.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to collecting and transforming component instrumentation data for efficient storage in distributed multidimensional data stores. Such data may be associated with any measurements realized through log instrumentation, for example, associated with quality of service and usage metrics. According to some embodiments, the usage data from software components may be analyzed by local and/or distributed processes. The analysis data records may be transformed into objects that include a timestamp, a position vector representing the dimensions of analysis, and/or a set of typed measurements. The records may be stored through indices for the location vector coordinates and timestamps at the distributed data stores.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
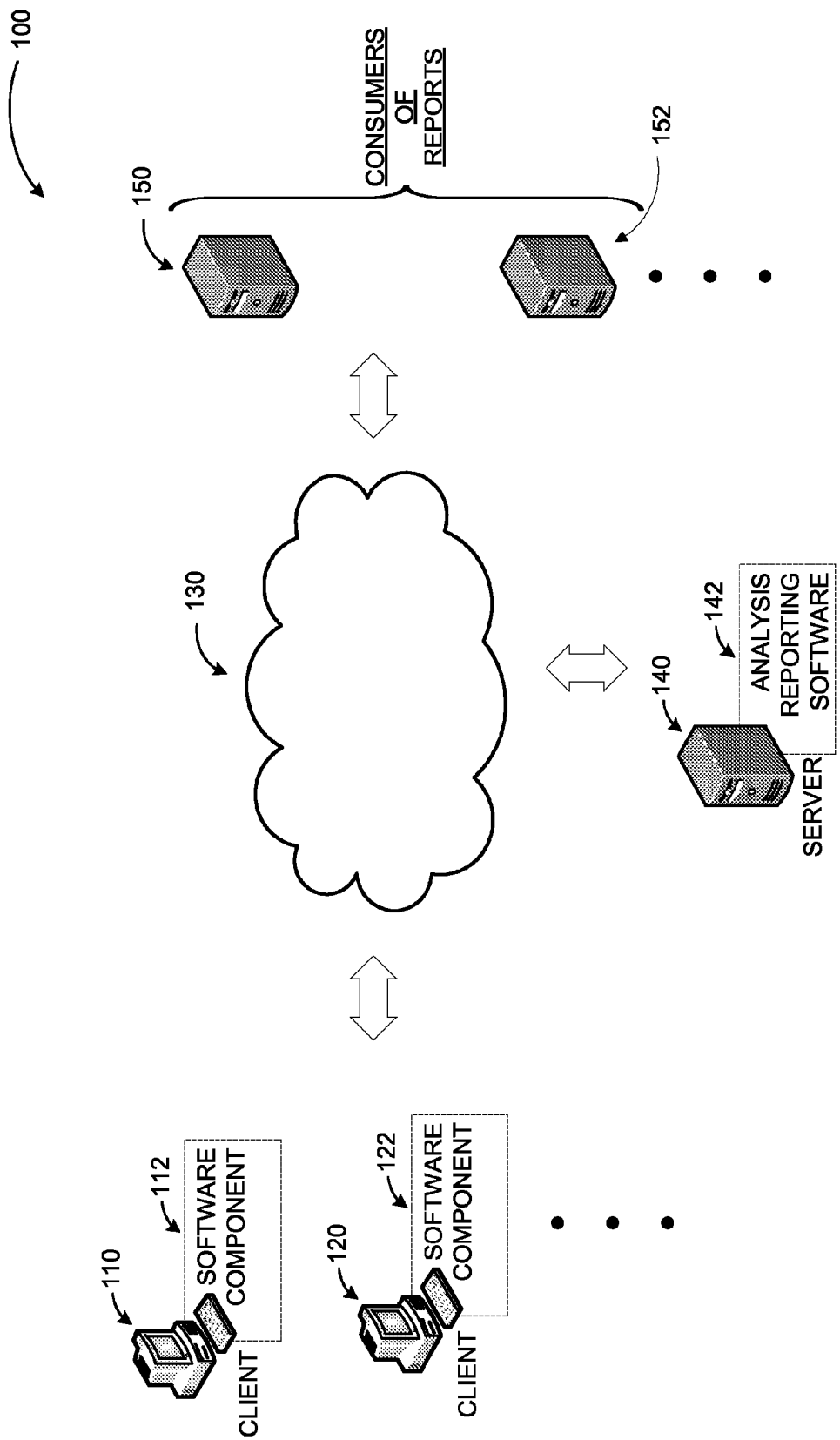
FIG. 1 is a diagram illustrating the interaction between software components of report provider and consumers.

As briefly described above, component instrumentation data from clients may be transformed for storage in multidimensional data stores in a distributed web service system creating objects that include a timestamp, a position vector representing the dimensions of analysis, and/or a set of typed measurements. The records may be stored at the multidimensional data stores with indices on the location vector coordinates and the timestamp. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing web services with QoS and usage metric data gathering, analysis, and reporting. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates the interaction between software components of report provider and consumers, where embodiments may be implemented for transforming metrics data in distributed reporting systems. As shown in diagram 100, instrumentation components 112, 122—each component of an online service—may generate usage logs for operations they perform. This usage data may to be stored temporarily on a data store of client devices 110, 120. Client devices 110, 120 may include any computing device such as a personal computer, a laptop, a mobile device such as a smart phone, a server, a vehicle mount computing device, and others that are connected to a network such as network 130.

On each managed client device, a local software process may periodically or on-demand process the locally stored usage data transforming and aggregating the raw usage data to extract quality of service data. The QoS data may be uploaded to a multidimensional database through network 130, where one or more applications/modules managed by server 140 may merge the data with data processed on other client devices.

Analysis and reporting software 142 on server 140 may also analyze the data, manage its storage in a distributed file system, and upload analysis results to the multidimensional database for consumption by report consuming applications on one or more servers such as servers 150, 152, etc. Server 140 and servers 150, 152 may be single or multiple physical servers (clusters), virtual servers, combinations, etc. Due to a number of operations performed on each client device, a number of clients devices, and web service components, the generated raw data may be quite sizeable and difficult to store/access consuming significant resources (memory, processing power, network bandwidth, etc.). A system according to embodiments may simplify the storage of these different kinds of data, by enabling an operator that configures the local and distributed analysis routines with tools to map the raw records into a stream including of a single timestamp, a number of dimensions, and a number of measurements as described below in more detail.

Figure 2:
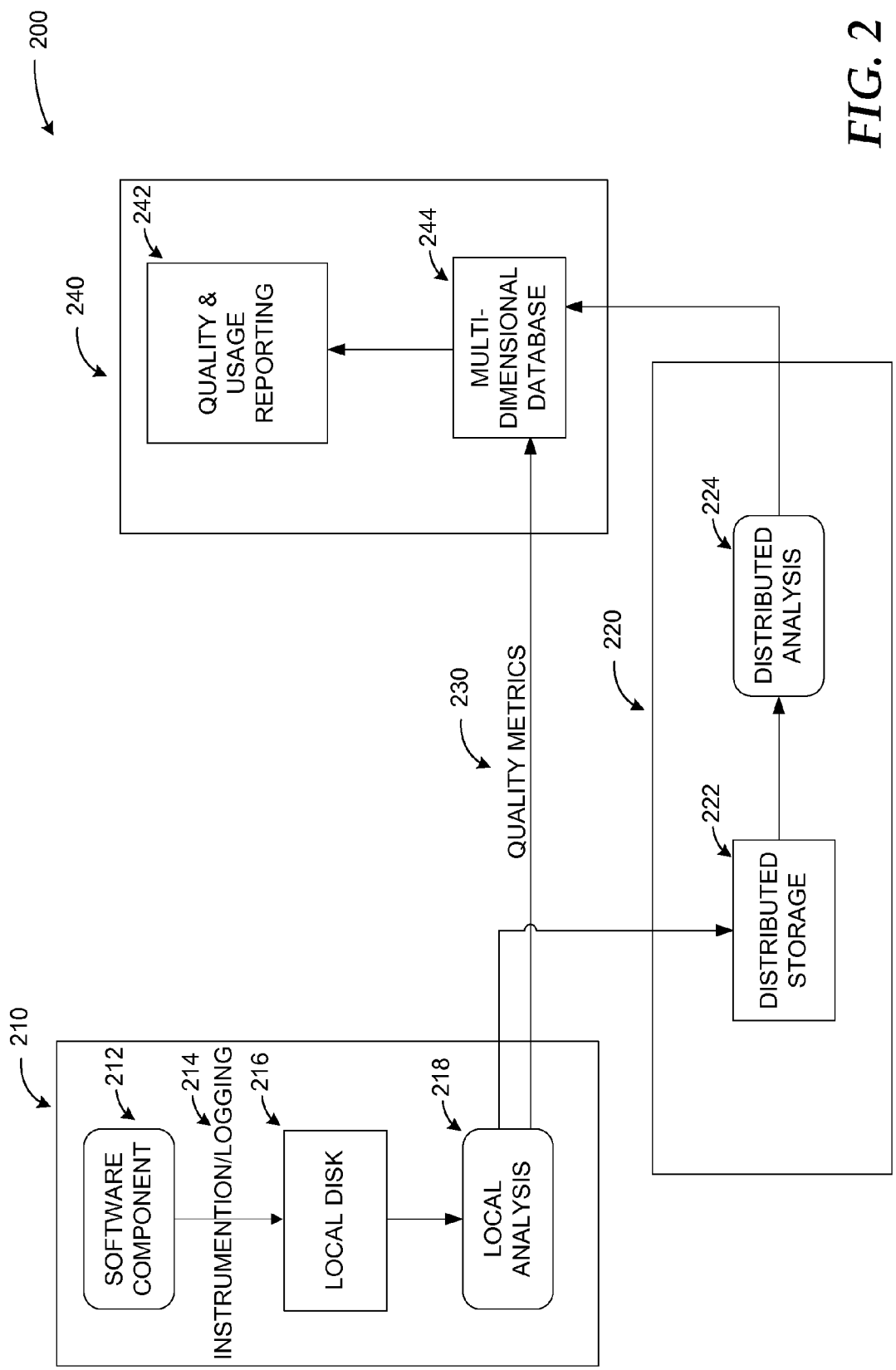
FIG. 2 illustrates an example system diagram displaying interactions between components for storage of quality and usage data.

FIG. 2 illustrates an example system diagram displaying interactions between components for storage of quality and usage data. Diagram 200 displays local metrics generation system 210 with one or more software components 212 performing instrumentation tasks (collecting data associated with performed operations, logging, etc.) and storing collected records in a local disk 216 or similar data store. A local analysis component 218 at the local metrics generation system 210 may transform and aggregate the usage data to extract QoS data, and upload the quality metrics 230 (raw usage data and QoS data) to a distributed file system 220, which includes distributed storage 222.

A distributed analysis component 224 may merge the data with data from other client devices. On a periodic or on-demand basis, the configurable distributed analysis component 224 may process the raw usage data stored in the distributed file system 220. The results of these analysis routines are stored in the distributed file system, and then upload to the multidimensional database 244 of reporting service 240 with the QoS data. Quality and usage data reporting component 242 may make analysis results and data available to consumers such as other services requesting the usage analysis.

For enhanced efficiency in storing different kinds of usage and QoS data, the raw data, which may be simple tuples, may be transformed into a stream of a timestamp, a number of dimensions, and a number of measurements. According to some embodiments, the timestamp may be treated as a special dimension that is also used for data expiration. As such, the timestamp may be given high priority in the selection index for the data.

The dimensions may be used to generate a vector based on ordering the names of the dimensions (e.g. alphabetically) and generating a string (e.g. of the form Dimension1=Value1, Dimension2=Value2, etc.). According to other embodiments, the string may be hashed, and the string and hash stored in a table of vectors. Each of the components of the vector may be likewise stored in a table that is an index on the dimensions. With this combination, matching of new data to existing data may be satisfied efficiently with a hash-assisted lookup. All vectors may be selected such that DimentionX=ValueX. According to further embodiments, each of the measurement values may be stored in a sparse table supporting various aggregation types such as count, sum, average, standard deviation, minimum, maximum, and comparable ones. The table may be keyed by the timestamp, the vector key, and/or the measurement key.

According to yet other embodiments, a dynamic view may be generated at the time of definition of the stream to support access. The views may return the source data to its original form by a series of join operations. The existence of the view(s) at the multidimensional database(s) may enable the queries against the database(s) to be optimized by a native query optimizer, enhancing performance of the system.

Figure 3:
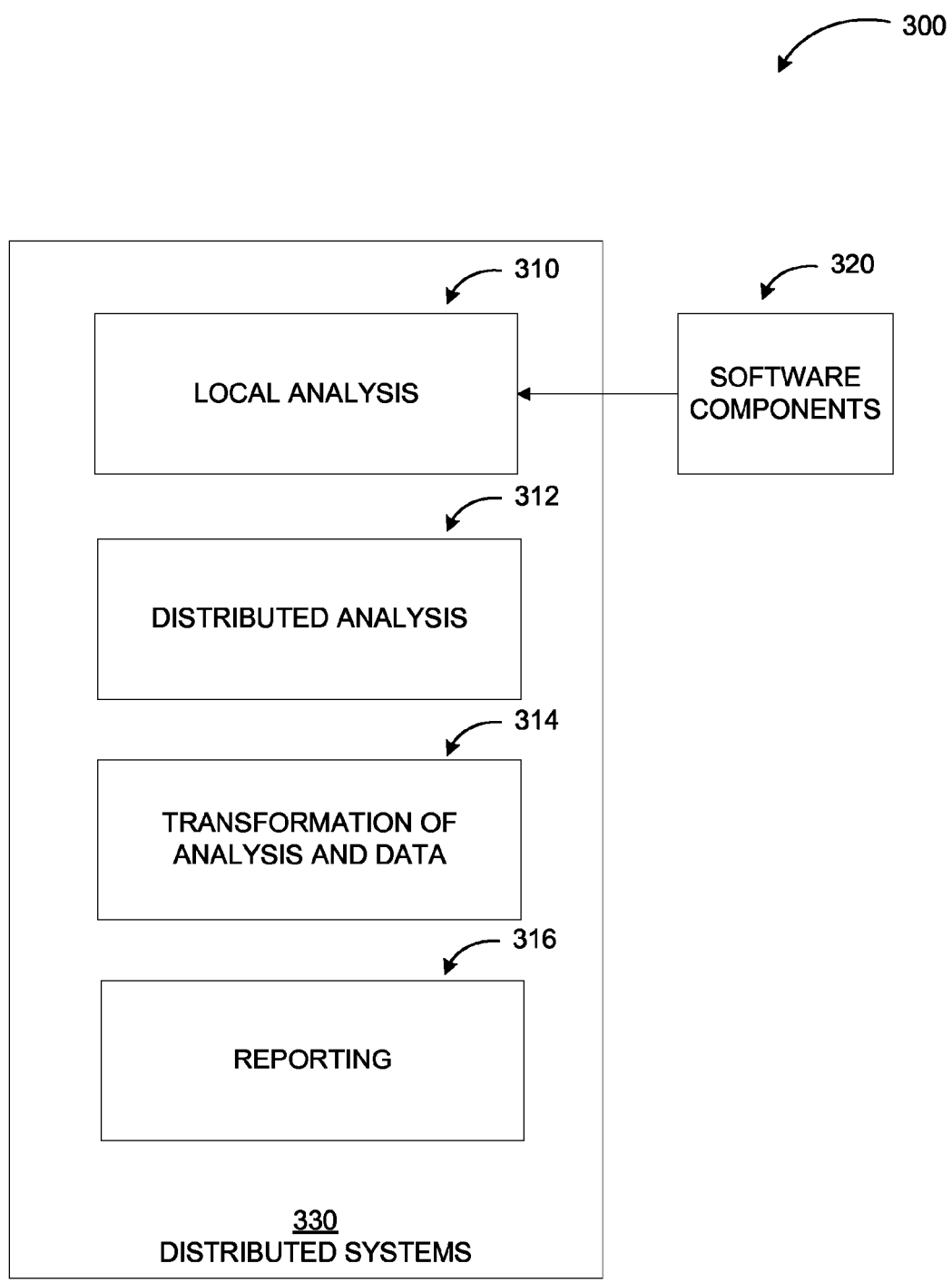
FIG. 3 illustrates core systems of metrics data transformation.

FIG. 3 illustrates core systems of metrics data transformation. As shown in diagram 300, a local analysis module 310, a distributed analysis module 312, a transformation and data analysis module 314, and a reporting module 316 may form distributed system 330, which may interact with a plurality of software components 320 to gather, process, store, and avail metrics data to consumers of metrics reports. For massive data output such as web data usage logs, storage and analysis of the raw usage data through distributed systems needs to be scalable. Distributed system 330 may receive metrics data from one or more metrics data producers (software components 320). Local analysis module 310 may actually reside in local client machines and perform local analysis on collected data to extract QoS and similar information. Some or all of the data may be stored locally, while a portion or all of the data may also be stored in a distributed file system.

As discussed previously, data from various clients may be combined and analyzed at the distributed file system by the distributed analysis module 312 and transformed for uploading to multidimensional databases along with analysis results. Various efficiency mechanisms such as vector based indexing as described above may be employed to reduce the stored data to a manageable level and increase an efficiency of accessing that data. Reporting module 316 may facilitate rendering analysis reports available to external consumers of the data such as other web services or web services that manage the components generating the data.

System rules or user specified parameters may be used in gathering local metrics data and extraction of QoS data. An example of such parameters may be quality thresholds, which may be set manually by a user or automatically derived based on system settings and configurations. The distributed file system and multidimensional database(s) may also be scalable to meet client/system demands.

The example systems and interaction discussed in FIG. 1 through FIG. 3 are for illustration purposes only and do not constitute a limitation on embodiments. Lightweight, multi-dimensional, online data storage for web services usage reporting may be implemented with other components, data storage methods, and configurations using the principles described herein. Furthermore, QoS data has been used as an illustrative example throughout the description, but embodiments are not limited to QoS systems. Indeed, data associated with any measurement realized through log instrumentation may be transformed and stored using the principles described herein.

Figure 4:
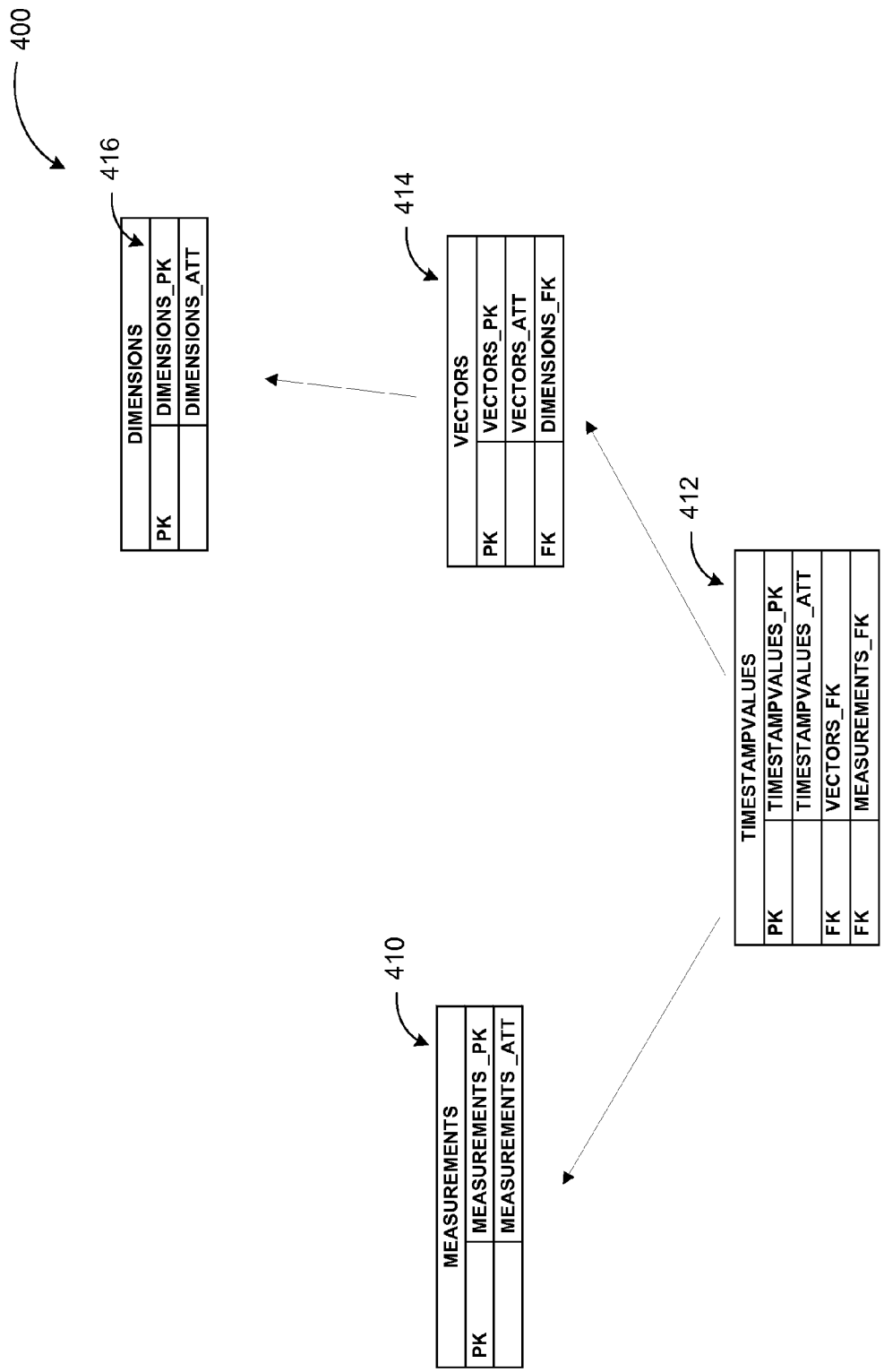
FIG. 4 is a high level entity relationship diagram of transformation data.

FIG. 4 is a high level entity relationship diagram of transformation data. Diagram 400 shows an example high level schema that may be used to structure data storage in a system according to embodiments. Measurements 410 may include one or more measurements attributes and a measurement primary key. The measurement values may be stored in a sparse table, providing the flexibility of allowing different types of aggregates without consuming unnecessary space. Similarly, dimensions 416 may include one or more dimension attributes and a dimensions primary key. Vectors 414 may include a vector primary key, vector attributes and a dimensions foreign key.

The structured records created by transforming the stream may be employed to import the data into the schema. The schema may follow an extensible markup language (XML) format, for example. The model for the data may utilize name/value pairs of the properties as dimension/value pairs. Using these, a vector may be constructed for each ordered tuple. To order the tuple, the sort order of the dimension names may be used. Through the constructed vector, a compact identifier is created for each possible point in the space defined by the stream. This space can thus be efficiently filtered based on any of the attributes, and does not require special schema support for each stream format. Streams may need to be placed in an indexed data store to allow fast filtered retrieval. The structures may also contain a timestamp along with the dimensions and measurements. Timestamp values 412 may thus include a timestamp primary key, timestamp attributes, a vectors foreign key, and a measurements foreign key.

Figure 5:
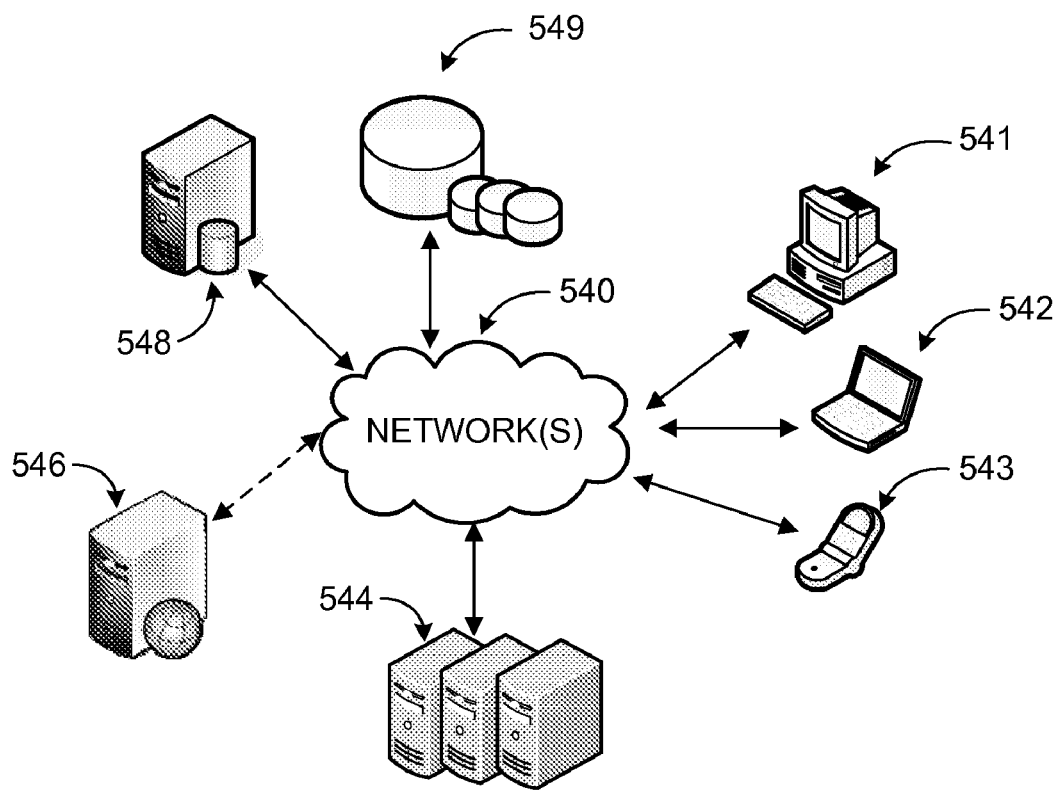
FIG. 5 is a networked environment, where a system according to embodiments may be implemented.

FIG. 5 is an example networked environment, where embodiments may be implemented. A platform transforming component instrumentation data into QoS and usage metrics in distributed client-server systems may be implemented via software executed over one or more servers 544 or a single server (e.g. web server) 546 such as a hosted service. The platform may communicate with client applications on individual computing devices such as a smart phone 543, a laptop computer 542, or desktop computer 541 ('client devices') through network(s) 540.

As discussed above, distributed analysis server may manage transformation and aggregation of usage data at instrumentation components uploading of QoS data to multidimensional database(s) such as data stores 549, combination of QoS data with data from other local components, storage of raw usage data and QoS data at a distributed file system, and analysis of the stored data for reporting consumers (e.g. other servers).

Client devices 541-543 may include instrumentation components that in conjunction with a logic client running on a web server (e.g. on the servers 544 or on individual server 546) enables access to applications executed on remote server (s) (e.g. one of servers 544) as discussed previously. The remote application server may retrieve or store relevant data from/to data store(s) 549 directly or through database server 548.

Network(s) 540 may comprise any topology of servers, clients, Internet service providers, and communication media. A system according to embodiments may have a static or dynamic topology. Network(s) 540 may include secure networks such as an enterprise network, an unsecure network such as a wireless open network, or the Internet. Network(s) 540 may also coordinate communication over other networks such as Public Switched Telephone Network (PSTN) or cellular networks. Furthermore, network(s) 540 may include short range wireless networks such as Bluetooth or similar ones. Network(s) 540 provide communication between the nodes described herein. By way of example, and not limitation, network(s) 540 may include wireless media such as acoustic, RF, infrared and other wireless media.

Many other configurations of computing devices, applications, data sources, and data distribution systems may be employed to implement a lightweight, multidimensional online data storage system for web service usage reporting. Furthermore, the networked environments discussed in FIG. 5 are for illustration purposes only. Embodiments are not limited to the example applications, modules, or processes.

Figure 6:
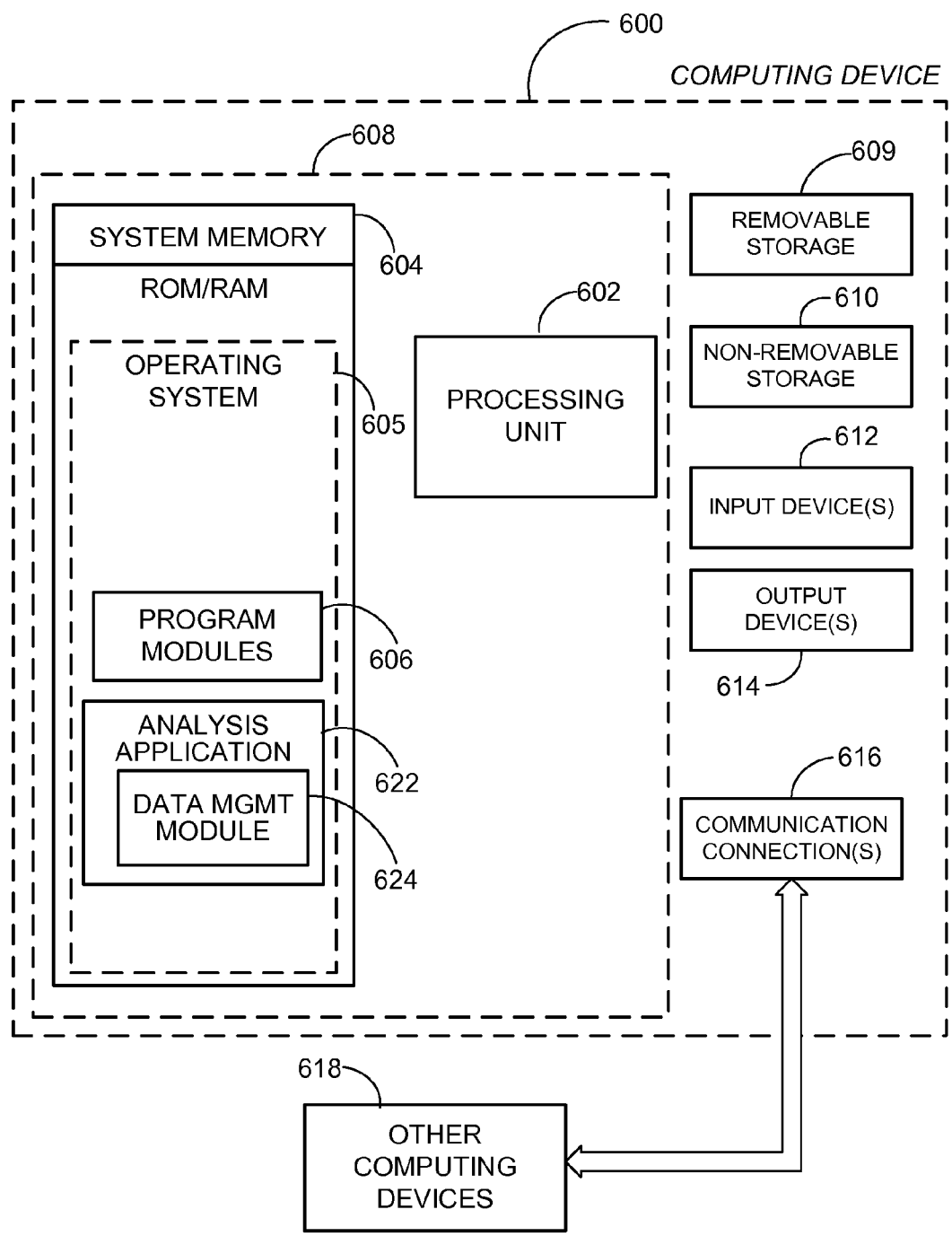
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a server executing an analysis and data management application and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, analysis and application 622, and data management module 624.

Analysis application 622 may be part of a service manages multidimensional, online data storage for web service usage reporting between client applications, servers, and other devices, and analyzes stored data. Data management module 624 may manage storage of QoS and raw usage data at a distributed file system, uploading of QoS data and analysis results to multidimensional databases employing mapping of raw data to a stream including a timestamp, a dimension, and a measurement, and a vectors based on the dimension(s) as discussed previously. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute web services, analysis services, data storage services, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
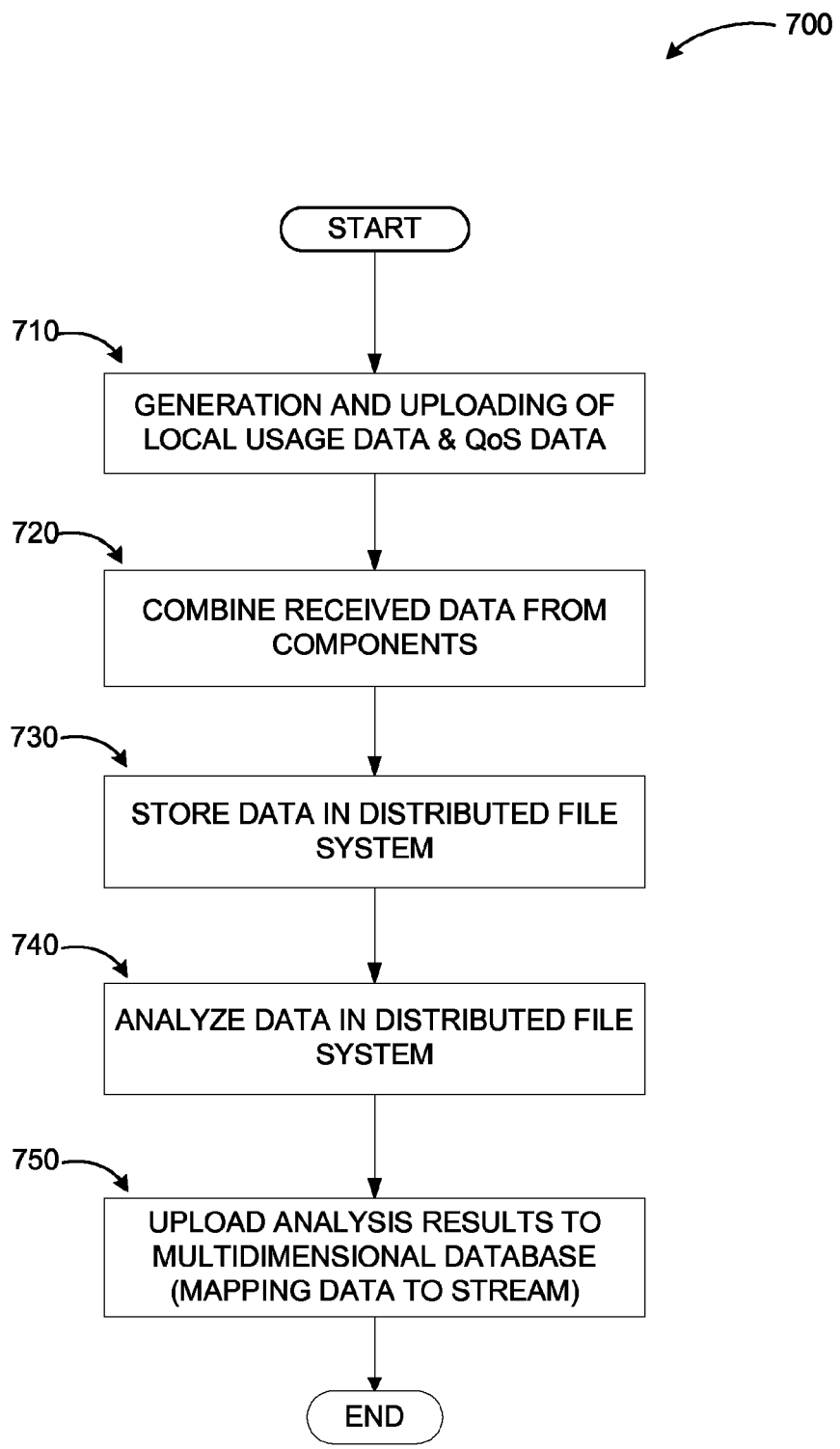
FIG. 7 illustrates a logic flow diagram for a process of transforming component instrumentation data into quality of service (QoS) and usage metrics in multidimensional storage according to embodiments.

FIG. 7 illustrates a logic flow diagram for a process of transforming component instrumentation data into quality of service and usage metrics in multidimensional storage according to embodiments. Process 700 may be implemented by an analysis and/or data management application executed on a server as part of a distributed system.

Process 700 begins with optional operation 710, where local instrumentation component data (raw usage data) is generated and QoS data extracted from the raw usage data locally. At operation 720, raw usage data and QoS data received from a plurality of components/clients is combined and stored in a distributed file system at operation 730 under the supervision of the analysis/data management application.

The data in the distributed file system may be analyzed at operation 740 and results uploaded to the multidimensional database(s) at operation 750. In the storage and uploading operations, the raw usage data may be mapped to a stream that includes a timestamp, dimensions, and measurements. For efficient storage and access to the data, vectors may be generated by ordering names of the dimensions alphabetically, generating a string of the names and values of the dimensions, hashing the string, and storing the string and the hash in a table of vectors. The table may be used as an index on a dimension, and new QoS data may be matched to existing QoS data through a combination of the vectors and the index through a hash-assisted lookup.

The operations included in process 700 are for illustration purposes. A transformation process according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing online data storage associated with usage reporting, the method comprising:
    causing raw usage data to be transformed and aggregated for extraction measurement data at local components;
    causing the measurement data to be uploaded to a multidimensional database;
    combining the received measurement data with data processed by other local components;
    store raw usage data and measurement data to a distributed file system;
    combining the raw usage data and the measurement data at the distributed file system;
    mapping the raw usage data to a stream comprising a timestamp, at least one dimension, and at least one measurement;
    generating at least one vector based on: ordering names of the at least one dimension alphabetically and generating a string comprising the names and values of each dimension;
    hashing the string;
    storing the string and the hash in a table of vectors, wherein components of the vectors are stored in a table serving as an index on a dimension; and
    selecting vectors based on matching dimension names and values.

2. The method of claim 1, further comprising:
    analyzing the raw usage data stored in the distributed file system;
    storing results of the analysis in the distributed file system; and
    uploading the results of the analysis to the multidimensional database with the measurement data.

3. The method of claim 2, wherein the analysis is on one of a periodic basis and on-demand basis.

4. The method of claim 2, wherein the analysis is performed by configurable analysis routines.

5. The method of claim 1, wherein transformation and aggregation is on one of a periodic basis and on-demand basis.

6. The method of claim 1, further comprising:
generating the usage data for each operation performed by each local component; and
storing the usage data temporarily on a local storage device.

7. The method of claim 1,
wherein the timestamp indicates expiration time for the stored raw usage data and is treated as a special dimension.

8. The method of claim 1, wherein the measurement data is Quality of Service (QoS) data.

9. A computing device for providing online data storage associated with usage reporting, the computing device comprising:
a memory;
a processor coupled to the memory, the processor executing a distributed application in conjunction with instructions stored in the memory, wherein the application is configured to:
cause raw usage data to be transformed and aggregated for extraction of Quality of Service (QoS) data at local components;
cause the Qos data to be uploaded to a multidimensional database;
combine the received QoS data with data processed by other local components;
store the raw usage data and the QoS data at a distributed file system;
analyze the raw usage data stored in the distributed file system;
combine the raw usage data and the QoS data at a distributed file system;
store results of the analysis in the distributed file system;
upload the results of the analysis to the multidimensional database with the QoS data;
map the raw usage data to a stream comprising a timestamp, at least one dimension, and at least one measurement;
generate at least one vector based on: ordering names of the at least one dimension alphabetically and generating a string comprising the names and values of each dimension;
hash the string;
store the string and the hash in a table of vectors; and
match new QoS data to existing QoS data through a combination of the vectors and an index employing a hash-assisted lookup.

10. The computing device of claim 9, wherein the raw usage data comprises simple tuples.

11. The computing device of claim 9, wherein each of the components of the vectors are stored in a table serving as the index on a dimension.

12. The computing device of claim 11, wherein the application is further configured to:
select vectors based on matching dimension names and values.

13. The computing device of claim 9, wherein each of the measurement values are stored in a sparse table supporting aggregation types comprising at least one from a set of: a count, a sum, an average, a standard deviation, a minimum, and a maximum.

14. A method executed at least in part in a computing device for providing online data storage associated with usage reporting, the method comprising:
causing raw usage data to be transformed and aggregated for extraction of Quality of Service (QoS) data at local components;
causing the Qos data to be uploaded to a multidimensional database;
combining the received QoS data with data processed by other local components;
storing the raw usage data and the QoS data at a distributed file system;
analyzing the raw usage data stored in the distributed file system;
combining the raw usage data and the QoS data at a distributed file system;
storing results of the analysis in the distributed file system;
uploading the results of the analysis to the multidimensional database with the QoS data;
mapping the raw usage data to a stream comprising a timestamp, at least one dimension, and at least one measurement;
generating at least one vector based on: ordering names of the at least one dimension alphabetically and generating a string comprising the names and values of each dimension;
hashing the string;
storing the string and the hash in a table of vectors, wherein components of the vectors are stored in a table serving as an index on a dimension;
matching new QoS data to existing QoS data through a combination of the vectors and the index employing a hash-assisted lookup; and
selecting vectors based on matching dimension names and values.

15. The method of claim 14, wherein the method further comprises:
generating a dynamic view at the time of definition of the stream.

16. The method of claim 15, wherein the method further comprises:
displaying in the dynamic view, source data in original format employing at least one join.

17. The method of claim 15, wherein the method further comprises:
optimizing queries against the multidimensional database by a native query optimizer through the dynamic view.

* * * * *